(12) United States Patent
Chang

(10) Patent No.: US 6,195,862 B1
(45) Date of Patent: Mar. 6, 2001

(54) TUBING DISCONNECT TOOL WITH ANGLED SEMI-ANNULAR HEADS

(76) Inventor: Wen-Lung Chang, 915 Linden Ave., South San Francisco, CA (US) 94080

( * ) Notice: Subject to any disclaimer, the term of this patent is extended or adjusted under 35 U.S.C. 154(b) by 0 days.

(21) Appl. No.: 09/416,803

(22) Filed: Oct. 13, 1999

(51) Int. Cl.$^7$ .................................................. F16L 35/00
(52) U.S. Cl. ........................................................ 29/237
(58) Field of Search ............................ 29/272, 237, 235, 29/268; 294/99.1, 99.2, 33

(56) References Cited

U.S. PATENT DOCUMENTS

| | | | |
|---|---|---|---|
| 900,735 | * | 10/1908 | Holmberg .............................. 29/268 |
| 5,084,954 | * | 2/1992 | Klinger ................................... 29/237 |

* cited by examiner

Primary Examiner—Robert C. Watson
(74) Attorney, Agent, or Firm—David E Newhouse

(57) ABSTRACT

An improved, angled head, tubing disconnect tool is described designed for de-coupling annular tubing telescoping around connecting to connection nipples jutting from planar wall surfaces in narrow confined spaces.

4 Claims, 3 Drawing Sheets

TUBING DISCONNECT TOOL WITH ANGLED SEMI-ANNULAR HEADS

BACKGROUND OF THE INVENTION

1. Field of the Invention

The invention is a tool specifically designed for disconnecting flexible tubing telescoping around cylindrical connection nipples jutting from planer surfaces in narrow spaces.

2. Description of the Prior Art

Tubing disconnect tools for disconnecting tubing telescoping around and connecting to connection nipples are well known. Typically such tools include two coupled, cooperating semi-annular 'clamshell' heads that, when closed together, form an annular body with an inner bore diameter equal to or slightly less than that of a stem of a particular connection nipple. The exterior diameter of the formed annular tool body is stepped with a larger diameter annular base dimensioned to abut against the end of the flexible tubing connected to the nipple, and an extending, smaller diameter engagement/working tip dimensioned to slip/wedge into the annular junction between the end of the telescoping flexible tubing and the stem of the connection nipple.

In operation, the semi-cylindrical 'clamshell' heads of such tubing disconnect tools are closed around the stem of the connection nipple behind the end of the telescoping tubing with the engagement/working tip addressing the end of the tubing. The closed 'clamshell heads are then urged against the end of the telescoping tubing wedging the annular engagement/working tip between the nipple stem and the tubing. Ideally, the end of the tubing elastically expands initially slipping onto the small diameter, engagement/working tip until stopped by the larger diameter annular base. The tool with the tubing now disposed around engagement/working tip can then be easily slipped off the connection nipple responsive to continued axial urging. [See U.S. Pat. No. 5,471,728 Feese et al describing a fuel line disconnect tool.

The engagement/working tip defined by the closed semi-cylindrical 'clamshell heads tubing disconnect tool may be castled to provide slots between fingers located for registion with protrusions of a retainer clip securing a head of a connection nipple within a surrounding/telescoping body of a quick-connect assembly. In this case, in addition to urging the engagement/working tip of the closed tool into the annular space between the surrounding/telescoping body of the assembly and the stem of the connection nipple, once the tip is inserted, the tool is rotated relative to the axis of the stem of the nipple such that the fingers expand the retainer clip allowing the surrounding/telescoping body to be slipped off the head of the connection nipple, or alternatively, the connection nipple to be pulled from of the surrounding/telescoping body. [See U.S. Pat. No. 5,909,901 Zillig et al.]

Typically, the cooperating the semi-cylindrical heads of such tubing disconnect tools are pivotally coupled together such that the 'clamshell' heads are rotatable about an axis parallel to the axis of the annular body defined by the closed cooperating heads [See FIGS. 1 & 2, U.S. Pat. No. 5,909, 901, supra] allowing the heads to be opened and be closed around a stem of a connection nipple. Tubing disconnect tools commercially available in sets for different diameter connection nipples typically locate the cooperating 'clamshell' heads at the distal ends of pivotally coupled shanks integral with and extending perpendicularly from the larger diameter semi-annular bases of the cooperating heads. [See FIG. 1, denoted as Prior Art.]

In mechanical assemblies, fluid tubing connection nipples are typically located at positions that may facilitate tubing connection during assembly, but all to frequently frustrate disconnection during disassembly. For example, the fuel line disconnect tool described in Feese et al is designed for disconnecting particularly inaccessible nipple connections at the fuel tank of 1992 and later model Ford pick-up trucks.

While inaccessible connection nipples do pose problems for disassembly, one of the more common locations for tubing connection nipples that facilitate fabrication yet frustrate disassembly are those perpendicularly extending out of planer surfaces in narrow confined spaces, e.g. the space between the motor and the firewall of a motor vehicle separating the motor compartment from the passenger compartment. Typically, such connection nipples have short stems with commensurately small spaces between the planer wall and the end of the connecting telescoping tubing.

Closing cooperating semi-annular 'clamshell' heads of typical tubing disconnect tools around the small section of the connection nipple stems adjacent a planer wall can be quite trying particularly in narrow, confined spaces. Then making things even more difficult, invariably, the perpendicular distance between the end of the connection nipple along its axis and the nearest obstruction is short, usually providing just enough room to preclude crimping of the connected tubing telescoping around the connection nipple. In other words, a fuel line disconnect tool per the teachings of Feese et even with "bent" elongated spring arms [Col. 4, ll. 12–24] is not suited for such narrow spaces because the tensile force aligned with the axis of the nipple connection necessary for effecting the disconnection does not simultaneously provide a force clamping the 'clamshell' heads around the stem of the tube.

Typical prior art tubing disconnect tools of the kind illustrated in FIG. 1 also are not suitable in narrow spaces because the perpendicularly extending, pivotally coupled shanks typically abut against the planar wall, making it difficult to close the cooperating 'clamshell' heads around the nipple stem, particularly when the length of the cooperating semi-annular 'clamshell' heads is greater than the space between the tubing end and the wall. Second, with the coupled shanks abutting against the adjacent wall, it is nearly impossible to provide a force aligned with axis of the nipple connection (and the annular body of the closed 'clamshell' heads) for wedging the engagement/working tip into the junction space between the nipple stem and tubing end.

SUMMARY OF THE INVENTION

A improved tool specifically invented for disconnecting flexible tubing telescoping around cylindrical connection nipples jutting from planer surfaces in narrow confined spaces includes cooperating semi-annular 'clamshell' heads located at the distal ends of two pivotally coupled shank arms oriented, upon closing, to form an annular tool body that has a longitudinal axis extending at an acute angle out of the engagement/working tip of the tool body relative to the plane of the pivoting coupled shank arms.

An intrinsic and useful property of the invented tubing disconnect tool is that the respective semi-annular 'clamshell' heads oriented at an angle relative to the plane of pivoting shanks, rotate together, not in a plane, but rather along a circular circumference. This constrains the semi-annular bases of the respective 'clamshell' heads to tangentially wedge against the planer wall out which the connection nipple juts as the cooperating heads close around the nipple stem, thus, forcing the engagement semi-annular tips of the heads initially to push against the end of the tubing and then, as the closing engagement tips aligned with the connection nipple stem, to wedge into the junction space between the telescoping tubing and the nipple stem.

The invented angled head tubing disconnect tool is suited for disconnecting tubing from connection nipples jutting perpendicularly from planer surfaces in narrow, confined spaces. In particular, once the cooperating 'clamshell' heads are closed around the stem of the connection nipple, the annular base of the formed tool rests against the planer wall surface which can then be utilized as a fulcrum for rocking the formed tool back an forth using the pivotally coupled shanks angling out from the planer surface as a levering handle. Such rocking action facilitates insertion or wedging of the engagement tip of the formed annular tool body into the junction between the tubing and the connection nipple stem. Moreover, the angled, handle provided by the extending coupled shanks of the invented tubing disconnect tool is easily grasped and manipulated in narrow confined spaces.

DESCRIPTION OF PREFERRED AND EXEMPLARY EMBODIMENTS

Figure 1:
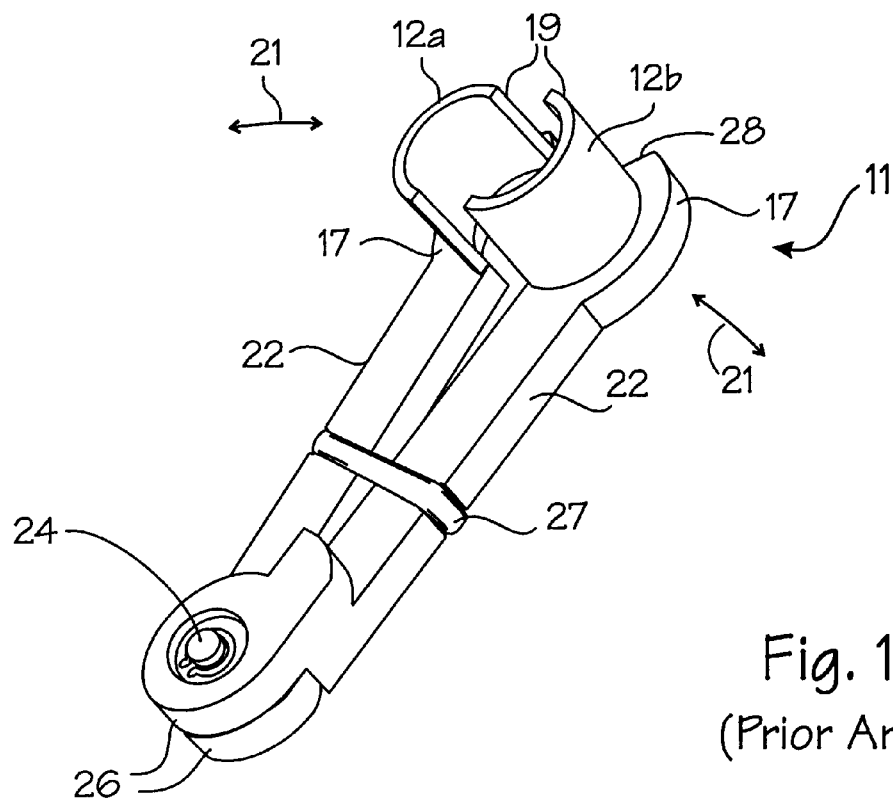
FIG. 1 is a perspective rending of a typical prior art tubing disconnect tool commercially available in sets for different diameter connection nipples.
Figure 2:
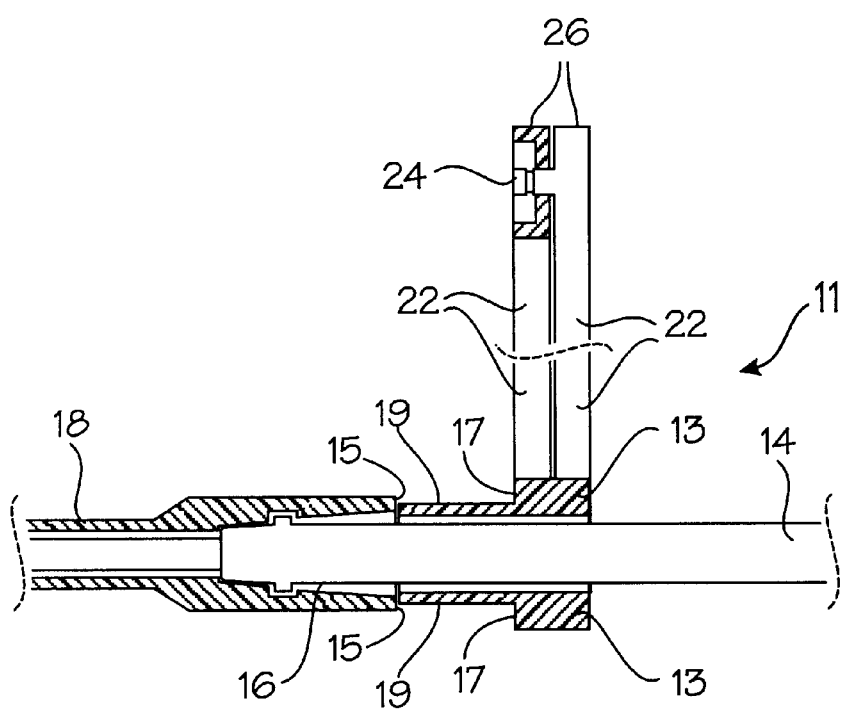
FIG. 2 is a cross-section elevation showing a connection nipple, telescoping tubing and a prior art tubing disconnect tool. (Feese et al)

Prior Art Description:

Looking at FIGS. 1 & 2 a conventional prior art tubing disconnect tool 11 includes two cooperating semi-annular 'clamshell' heads 12a & 12b that when closed together, define an annular body 13 having an inner bore diameter equal to or slightly less than that of a stem 14 of a particular connection nipple 16. The exterior diameter of the formed annular body 13 is stepped each 'clamshell' head providing: (i) a semi-annular base 17 dimensioned for abutting against the end 15 of a tubing 18 telescoping around connecting to the connection nipple 16, and (ii) an extending, semi-annular, smaller diameter engagement/working tip 19 dimensioned for slipping/wedging into the annular junction space between the tubing 18 and the stem 14 of the connection nipple 16. (See FIG. 2.) Shanks 22 extend perpendicularly from the semi annular bases 17 of each 'clamshell' head 12a & 12b. As shown, typically the shanks 22 are pivotally coupled allowing the cooperating 'clamshell heads' 12a & 12b to be rotated apart and clamped together (arrows 21) around the stem 14 of the connection nipple 16.

In the exemplary prior art tool illustrated in FIG. 1, the pivot coupling 24 is located at the respective distal ends 26 of the shanks 22. The cooperating semi-annular 'clamshell' heads 12a & 12b are typically resiliently held in a 'normally-closed' configuration, as in the example illustrated, by an elastic (rubber) band 27 stretched around the respective shanks 22 between the pivot coupling 24 and the 'clamshell' heads 12a & 12b. The respective semi-annular bases 17 of the illustrated tool 11 cooperated to define, when closed an angled V notch 28 at the junction on the side opposite the pivot coupling which, in combination with the elastic (rubber) band 27, facilitates clipping or fastening the illustrated tool 11 onto a stem 12 of a connection nipple 16.

Figure 3:
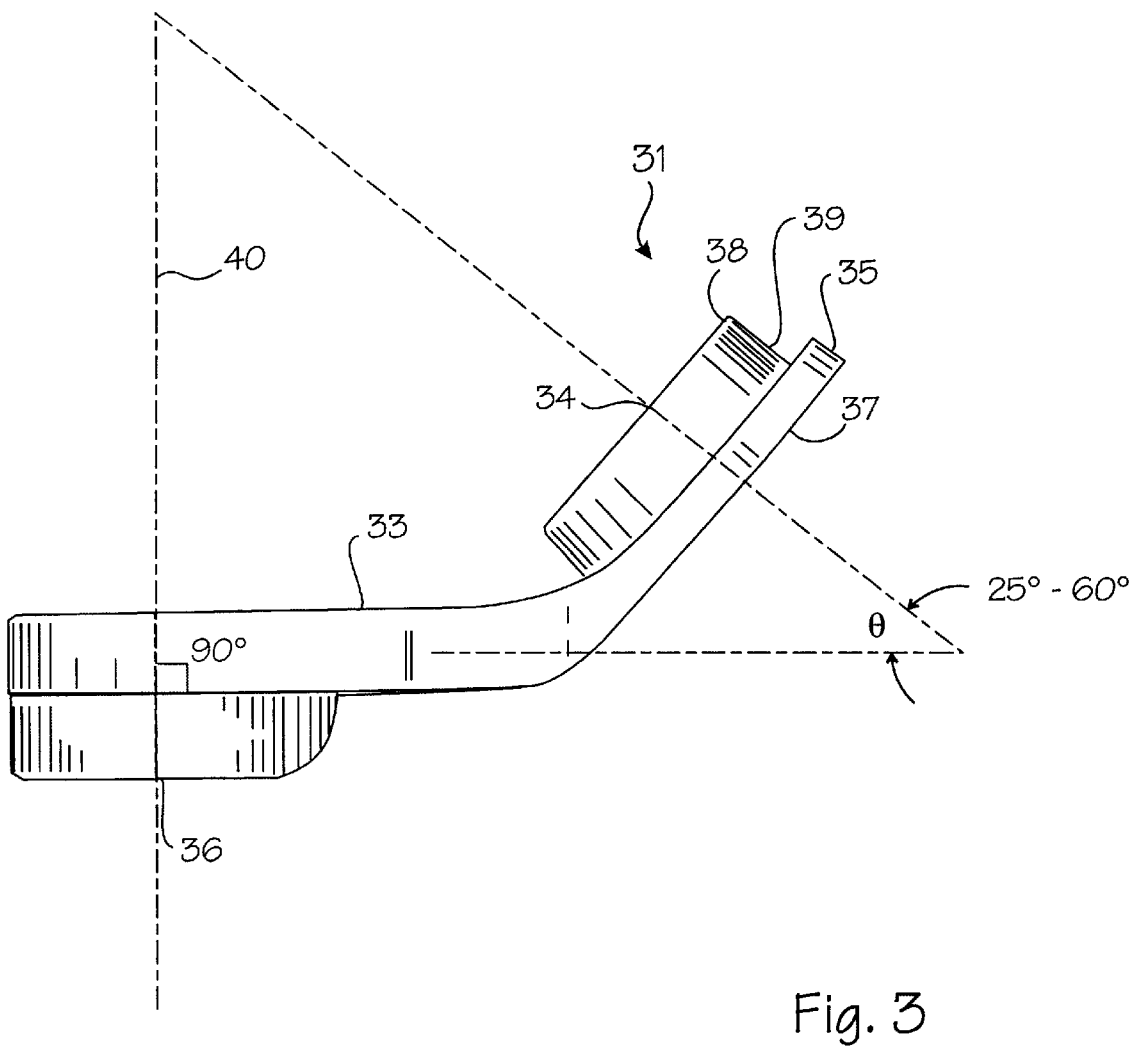
FIG. 3 is side elevation view of the invented angled head tubing disconnect tool.
Figure 4:
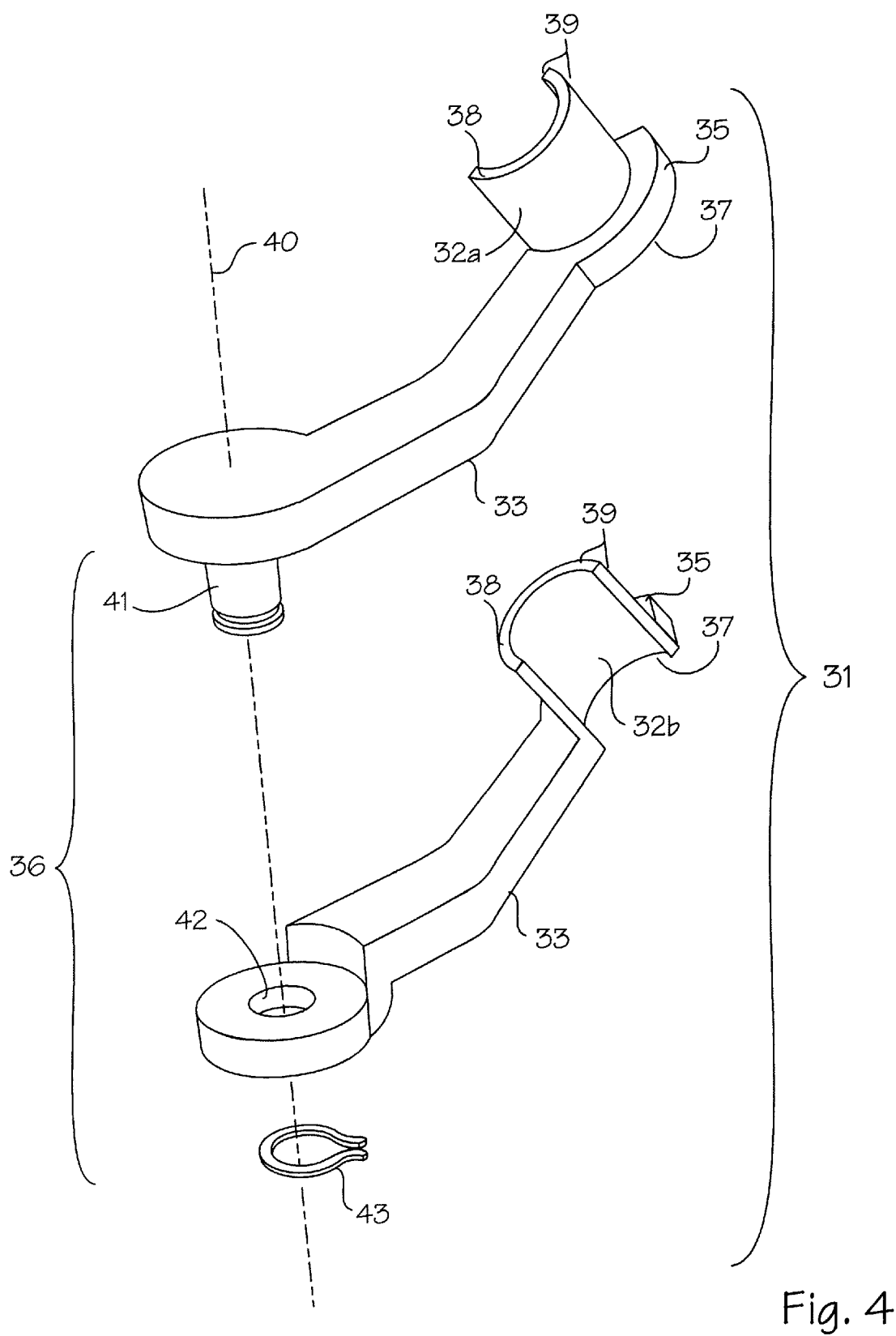
FIG. 4 is an exploded perspective rendering showing the elements of the invented angled head tubing disconnect tool.

Invention Description:

Looking now at FIGS. 3 & 4, similar to the illustrated prior art tool 11, the invented angled head tubing disconnect tool 31 includes two cooperating semi-annular 'clamshell' heads 32a & 32b which provide a large exterior diameter base or shoulder 35 and a smaller exterior diameter extending, engagement/working tip 39. But in contrast to the illustrated prior art tool 11, the invented tool 31 has shanks 33 extending at an angle Θ ranging from 15° to 75° (preferably 45°) relative to the axis of the annular body 34 formed by the closed 'clamshell' heads.

Like the illustrated prior art tool 11, the invented tool 31 has a pivot couple 36 consisting of a cylindrical shaft 41 integral with one shank 33 sized to be received/journaled within in a corresponding cylindrical bushing 42 extending through the other shank 33. Also like the illustrated prior art tool 11, the distal ends of the shanks 33 of the invented tool 31 are off set in an orthogonal manner for allowing a pivot coupling of the shaft 41 within bushing 42. A conventional retainer clip 43 snaps onto an annular slot 44 cut into the end of the shaft 41 extending through the cylindrical bushing 42 for securing the respective shanks 33 together.

In contrast to the illustrated prior art tool 11, the closing 'clamshell' heads 32a &32b of the invented tool 31 move along a circular circumference or locus relative to the axis of the pivot couple 36 because the axis 40 of the pivot couple 36 is not parallel to the axis of the annular body 34 defined by the cooperating 'clamshell' heads 32a & 32b. This means that inherently, the semi-annular end surfaces, (the flat base 37, the end edge 38 of the semi-annular engagement/working tips 39) of the closing 'clamshell' heads 32a & 32b tangentially approach planes perpendicular to the axis of the forming annular tool body 33 as they clamp around a stem 14 of a connection nipple 16. Accordingly, unlike the illustrated prior art tool 11, one or both of the semi-annular engagement/working tip 39 of the 'clamshell' heads (32a or 32b) of the invented angled head tool 31 can be placed against the end the tube telescoping around a connection stem of a nipple jutting from a wall, so that, as the invented tool is forced closed around that stem, the respective semi-annular end surfaces (37 & 38) of the 'clamshell' heads wedge tangentially into the space between the end of the tubing and the wall, forcing (with considerable mechanical advantage) the forming annular engagement/working tip 39 of the tool into the tubing-stem junction space expanding the tubing, or, alternatively, pushing/compressing the end of the tube and as well, any debris ahead of the tip as it translates into the junction space between the telescoping members of the tubing connection.

Once the invented angled head tubing disconnect tool 31 is closed around the jutting stem of the connection nipple, the extending shanks 33 of the formed tool (which angles toward the tip of the nipple connection) becomes a convenient handle for levering or rocking the annular engagement/working tip of the formed tool against the adjacent wall. In particular, the adjacent wall surface can be utilized as fulcrum for tipping the sides of the flat base surface 37 of the formed annular body 34 to drive the circumferentially opposite side of the formed annular engagement/working tip 39 into the junction of a reluctantly yielding telescoping tubing connection. The angled shanks 33 of the invented tool 31, when closed, also form a convenient handle oriented for easy manipulation of the tool in narrow spaces.

Like the prior art tool illustrated (FIG. 1), a resilient elastic (rubber) band (not shown) may be stretched around the shanks 33 of the invented tool 31 between the pivot couple 36 and the 'clamshell' heads 32a & 32b to insure a normally closed status. The semi-annular bases 35 of the clamshell' heads 32a & 32b of the invented tool 31 may also be relieved to provide a V notch at the exterior junction when closed together for spreading the 'clamshell' heads apart responsive to a force translating the annular tool body with the notch registering against a stem of a connection nipple for facilitating clipping or "snapping" the invented tool around a stem of a jutting connection nipple.

The invented angled head tubing disconnect tool 31 is described in context of a prior art tubing disconnect tool illustrated in FIG. 1. In particular, the invented tool has all of the same functional elements as the illustrated prior art tool, the difference being an acute angle relationship between the longitudinal axis of the annular body formed by the closed cooperating 'clamshell' heads and both the pivot axis of the couple between the respective shanks and the handle formed by the shanks when the tool is closed. This difference in addition to providing additional functional properties, also makes the invented tool handier to use in narrow confined spaces.

It should be appreciated that many modifications and variations of the invented improvement embodied by the described angled head tubing disconnect tool can be made both with respect to the particular tool described and other analogous tools which, while not described above, fall within the spirit and scope of the invention as set forth in the appended claims.

I claim:

1. An improved tubing disconnect tool for de-coupling an annular tube telescoping around connecting to a connection nipple jutting from a planar surface including cooperating, semi-annular, 'clamshell' heads located at the distal ends of two coupled shanks pivoting in a pivot plane about a pivot axis oriented for closing together around a stem of the connection nipple forming a cylindrical annular tool body having a inner bore of a diameter at most equal to that of the stem of the connection nipple, and a stepped outer diameter with a larger diameter annular base dimensioned for abutting against an end of the tube telescoping around connected to the connection nipple, and an extending, smaller diameter engagement/working tip dimensioned for slipping/wedging into an annular junction space between the end of the telescoping tubing and the stem of the connection nipple, the improvement comprising (i) an acute angular relationship between a longitudinal axis defined by the annular body formed by the closed together 'clamshell' heads, the pivot plane and the pivot axis of the coupled shanks in a direction along the longitudinal axis moving from the larger annular base out the extending, smaller diameter engagement/working tip of the formed annular tool body, whereby, an acute angular relationship exists between the pivoting shanks extending from the larger diameter annular base of the formed tool body and the stem of the connection nipple.

2. An angled head, tubing disconnect tool for de-coupling annular tubing telescoping around connecting to a connection nipple jutting from a planar wall surface comprising, in combination, a) two coupled shanks rotatable in a pivot plane about a pivot axis;

b) a cooperating semi-annular 'clamshell' head located at the distal end of each shank, the shanks pivoting rotating in the pivot plane for closing the respective 'clamshell' heads around a stem of the connection nipple jutting from the planar wall surface, the cooperating 'clamshell' oriented for forming an annular tool body having:

(i) a stepped outer diameter with a larger diameter annular base dimensioned for abutting against an end of the tubing telescoping around connected to the connection nipple, and an extending, smaller diameter annular engagement/working tip dimensioned for slipping/wedging into an annular junction space between the end of the telescoping tubing and the stem of the connection nipple, and (ii) a inner bore of a diameter at most equal to that of the stem of the connection nipple, and (iii) a longitudinal axis having an acute angle relationship with the pivot axis of the coupled shanks and the pivot plane of the coupled shanks in a direction pointing from its larger diameter base shoulder out its smaller diameter engagement/working tip, whereby, an acute angular relationship exists between the stem of the connection nipple and the coupled shanks extending from the annular tool body closed around the stem of the connection nipple.

3. The tubing disconnect tool of claim 1 or 2 wherein the annular tool body formed by closing the cooperating, semi-annular 'clamshell' heads includes an exterior 'V' notch in the larger diameter annular base formed by and between facing sections of the cooperating, closing 'clamshell' heads radially outside the longitudinal axis of the formed tool body relative to the pivot axis of the coupled shanks, the 'V' notch having an apex co-planer with the longitudinal axis of the formed tool body.

4. The tubing disconnect tool of claim 3 further including a resilient band stretched around the coupled shanks between the pivot axis and the cooperating, 'clamshell' heads maintaining a normally closed relationship of the 'clamshell' heads, whereby, the tool can be snapped around the stem of the connection nipple by registering and laterally forcing 'V' notch in the larger diameter base of the formed annular tool body against the particular stem for spreading apart, moving and orienting the spreading 'clamshell' heads to sandwiching the stem of the connection nipple behind the end of the telescoping tubing, the resilient band snapping the moving 'clamshell' heads together as the inner bore of the formed annular tool body moves toward registry with the stem.

* * * * *